(12) United States Patent
Schultz et al.

(10) Patent No.: US 7,996,589 B2
(45) Date of Patent: Aug. 9, 2011

(54) AUTO-SUGGEST LISTS AND HANDWRITTEN INPUT

(75) Inventors: Tracy D. Schultz, Bellevue, WA (US);
Adrian Garside, Sammamish, WA (US);
Takanobu Murayama, Seattle, WA (US); Leroy B. Keely, Portola Valley, CA (US); Judy C. Tandog, Seattle, WA (US); Tobiasz A. Zielinski, Redmond, WA (US); Jeffrey W. Pettiross, Seattle, WA (US); Joshua A. Clow, Bellevue, WA (US); Shawna J. Davis, Seattle, WA (US); F. David Jones, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 11/249,739

(22) Filed: Oct. 14, 2005

(65) Prior Publication Data

US 2006/0282575 A1    Dec. 14, 2006

Related U.S. Application Data

(60) Provisional application No. 60/673,770, filed on Apr. 22, 2005.

(51) Int. Cl.
*G06F 13/12* (2006.01)
*G09G 5/00* (2006.01)
(52) U.S. Cl. .......................... 710/73; 345/156
(58) Field of Classification Search .................. 715/505, 715/507, 508; 710/62, 73; 345/178, 156; 709/206
See application file for complete search history.

(56) References Cited

U.S. PATENT DOCUMENTS

| 5,367,453 | A |   | 11/1994 | Capps et al. |
| 5,666,438 | A | * | 9/1997 | Beernink et al. ............... 382/189 |
| 5,768,616 | A | * | 6/1998 | Teterwak ........................ 710/5 |
| 5,828,783 | A | * | 10/1998 | Ishigaki ......................... 382/186 |
| 6,088,481 | A | * | 7/2000 | Okamoto et al. ............. 382/189 |

(Continued)

FOREIGN PATENT DOCUMENTS

RU      2000130232 A      11/2002

(Continued)

OTHER PUBLICATIONS

Powalka R K et al: "Multiple word segmentation with Interactive Look-up for cursive script recognition" Coument Analysis and Recognition, 1993, Proceedings of the Second International Conference on Tsukuba Science City, Japan Oct. 20-22, 1993, Los Alamitos, CA, USA, IEEE Comput. Soc, Oct. 20, 1993, pp. 196-199, XP010135794 ISBN: 978-0-8186-4960-8 *Abstract and 2* .

(Continued)

*Primary Examiner* — Henry W Tsai
*Assistant Examiner* — Hyun Nam
(74) *Attorney, Agent, or Firm* — Shook Hardy & Bacon LLP

(57) ABSTRACT

An interface is provided between a handwriting receiving panel and an auto complete process. A user writes onto the handwriting receiving panel which recognizes the handwritten text. The handwritten text is forwarded to the auto complete process which provides suggested content to the user based on the handwritten text. The user can select the suggested content for use with another application. Alternatively, the user may add additional information to the handwriting receiving panel to enable the auto complete process to provide more or different suggested content.

12 Claims, 12 Drawing Sheets

U.S. PATENT DOCUMENTS

| | | | |
|---|---|---|---|
| 6,377,965 B1* | 4/2002 | Hachamovitch et al. | 715/203 |
| 6,766,069 B1* | 7/2004 | Dance et al. | 382/309 |
| 7,185,271 B2* | 2/2007 | Lee et al. | 715/507 |
| 7,205,976 B2* | 4/2007 | Poo | 345/156 |
| 7,369,117 B2* | 5/2008 | Evans et al. | 345/156 |
| 2003/0033288 A1 | 2/2003 | Shanahan et al. | |
| 2003/0053084 A1* | 3/2003 | Geidl et al. | 358/1.6 |
| 2003/0212961 A1 | 11/2003 | Soin et al. | |
| 2004/0021700 A1* | 2/2004 | Iwema et al. | 345/863 |
| 2005/0128181 A1 | 6/2005 | Wang et al. | |
| 2006/0209040 A1* | 9/2006 | Garside et al. | 345/173 |
| 2006/0242608 A1* | 10/2006 | Garside et al. | 715/864 |

FOREIGN PATENT DOCUMENTS

| | | |
|---|---|---|
| RU | 2003129649 A | 10/2005 |
| WO | 98/11480 A1 | 3/1998 |
| WO | 9960468 A | 11/1999 |
| WO | 02073341 A | 9/2002 |

OTHER PUBLICATIONS

Yao: "Add Support for Digital Ink to your Windows Applications" MSDN Magazine, CMP Media, San Francisco, CA, US, Dec. 1, 2004, ISSN: 1528-4859.

Supplementary European Search Report, Jul. 29, 2009.

* cited by examiner

AUTO-SUGGEST LISTS AND HANDWRITTEN INPUT

RELATED APPLICATION INFORMATION

This application claims priority to U.S. Ser. No. 60/673,770, filed Apr. 22, 2005, whose contents are expressly incorporated herein by reference.

BACKGROUND OF THE INVENTION

Description of Related Art

Auto-suggest lists are currently used in user interfaces. For instance, when a user enters information into an address bar of an internet browser, the user may be presented with suggestions that complete the user's entry.

One advantage of the use of auto-suggest lists is its ability to provide a user with suggested completions of information already entered into a field. The auto-suggest lists provide suggestions of content based on at least one of 1) prior input or 2) expected input.

While conventional auto-suggest lists are helpful, they have been constrained to text-based input systems, namely reacting only to keyboard input. Users who use pen-based computing systems are limited in their use of auto suggest lists as conventional systems do not respond to handwritten input.

BRIEF SUMMARY OF THE INVENTION

Aspects of the present invention address one or more of the problems described above, thereby providing improved auto-suggest capabilities with respect to handwritten input. Aspects of the present invention allow users to enter or begin to enter handwritten information and have the system provide auto suggest content in response.

BRIEF DESCRIPTION OF THE DRAWINGS

The present invention is illustrated by way of example and not limited in the accompanying figures.

DETAILED DESCRIPTION OF THE INVENTION

Figure 1:
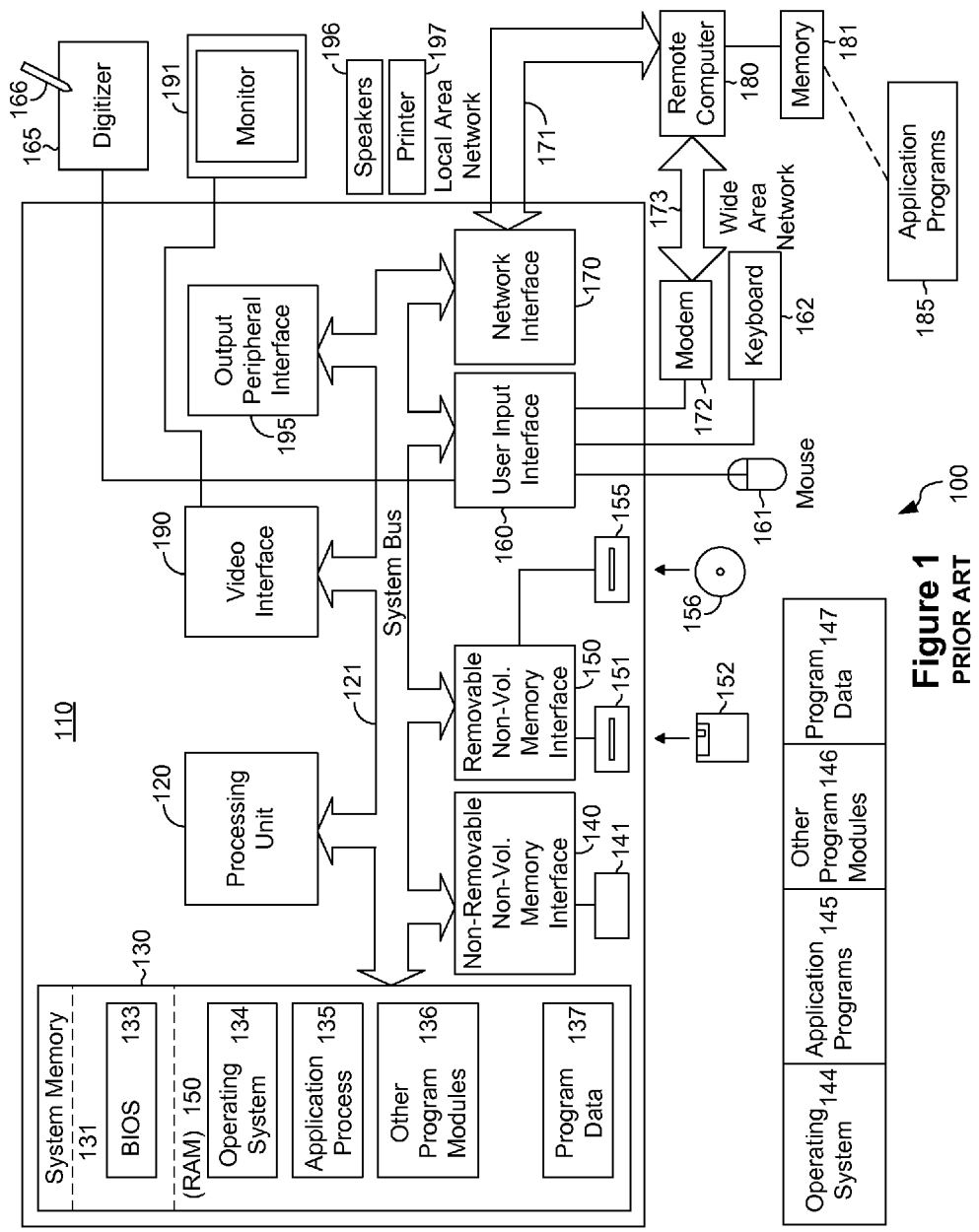
FIG. 1 illustrates a schematic diagram of a general-purpose digital computing environment in which certain aspects of the present invention may be implemented.

Aspects of the present invention relate to providing auto-suggest information in response to a user's handwritten input. The auto-suggest information may vary by application used. It is noted that various connections are set forth between elements in the following description. It is noted that these connections in general and, unless specified otherwise, may be direct or indirect and that this specification is not intended to be limiting in this respect.

Overview

Handwritten electronic ink is becoming increasingly popular with computer users. Despite increased acceptance, handwriting as an input form has its drawbacks. Importantly, handwriting recognition is not always perfect. The disconnect between a user intending to write one thing and having the handwriting recognized as another detracts from the user experience. Attempting to overcome the recognition failure, the user switches to typing (on an actual or displayed keyboard) or attempts to rewrite the handwritten ink. Understandably, users may become frustrated in using a stylus to control applications need text-based input to function.

Aspects of the invention relate to providing an interface between a handwriting receiving panel and an auto complete process. Here, in one example of the invention, an application may have a user interface that requires user input. The user, application, or operating system may invoke the handwriting receiving panel so as to accept the user's handwriting. The handwriting receiving panel may recognize and forward recognized text to an auto complete process, where the auto complete process determines suggested content based on the information it receives and awaits user input. The user may select one of the suggestions from the auto complete process and the selection is then forwarded to the application. Alternatively, the user may add more information to the handwriting receiving panel where the information is recognized and the auto complete process provides suggestions based on information from the handwriting receiving panel.

In other aspects of the present invention, the handwriting input panel and the auto complete process may exchange information back and forth as a user select and/or adds new information to the handwriting receiving panel.

In some situations, the user may be able to capitalize on information that was previously recognized, previously navigated to (as existing in memory), or capitalize on a predefined structure to the input information. These and other aspects of the present invention are described herein.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Among the characteristics described above, the temporal order of strokes and a stroke being a series of coordinates are primarily used. All other characteristics can be used as well.

Terms

| Term | Definition |
| --- | --- |
| Ink | A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level. |
| Ink object | A data structure storing ink with or without properties. |
| Stroke | A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points. |
| Document | Any electronic file that has a viewable representation and content. A document may include a web page, a word processing document, a note page or pad, a spreadsheet, a visual presentation, a database record, image files, and combinations thereof. |
| Render or Rendered or Rendering | The process of determining how information (including text, graphics, and/or electronic ink) is to be displayed, whether on a screen, printed, or output in some other manner. |
| Computer-readable medium | Any available media that can be accessed by a user on a computer system. By way of example, and not limitation, "computer-readable media" may include computer storage media and communication media. |
| Computer storage media | "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. |
| Communication media | "Communication media" typically embodies computer-readable instructions, data structures, program modules or other data in a modulated data signal, such as a carrier wave or other transport mechanism, and includes any information delivery media. |

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture free-hand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are exemplary and other means of establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

A programming interface (or more simply, interface) may be viewed as any mechanism, process, protocol for enabling one or more segment(s) of code to communicate with or access the functionality provided by one or more other segment(s) of code. Alternatively, a programming interface may be viewed as one or more mechanism(s), method(s), function call(s), module(s), object(s), etc. of a component of a system capable of communicative coupling to one or more mechanism(s), method(s), function call(s), module(s), etc. of other component(s). The term "segment of code" in the preceding sentence is intended to include one or more instructions or lines of code, and includes, e.g., code modules, objects, sub-routines, functions, and so on, regardless of the terminology applied or whether the code segments are separately compiled, or whether the code segments are provided as source, intermediate, or object code, whether the code segments are utilized in a runtime system or process, or whether they are located on the same or different machines or distributed across multiple machines, or whether the functionality represented by the segments of code are implemented wholly in software, wholly in hardware, or a combination of hardware and software.

Figure 1C:
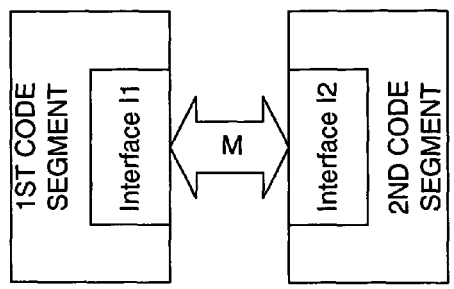
FIGS. 1B through 1M show a general-purpose computer environment supporting one or more aspects of the present invention.
Figure 1E:
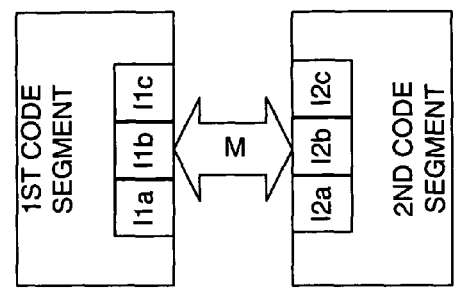
Figure 1B:
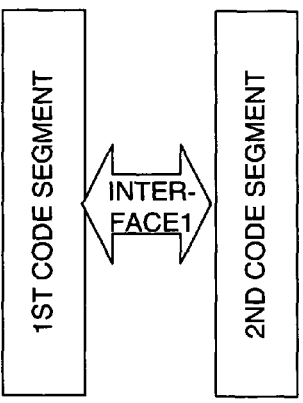

Notionally, a programming interface may be viewed generically, as shown in FIG. 1B or FIG. 1C. FIG. 1B illustrates an interface Interface1 as a conduit through which first and second code segments communicate. FIG. 1C illustrates an interface as comprising interface objects I1 and I2 (which may or may not be part of the first and second code segments), which enable first and second code segments of a system to communicate via medium M. In the view of FIG. 1C, one may consider interface objects I1 and I2 as separate interfaces of the same system and one may also consider that objects I1 and I2 plus medium M comprise the interface. Although FIGS. 1B and 1C show bidirectional flow and interfaces on each side of the flow, certain implementations may only have information flow in one direction (or no information flow as described below) or may only have an interface object on one side. By way of example, and not limitation, terms such as application programming interface (API), entry point, method, function, subroutine, remote procedure call, and component object model (COM) interface, are encompassed within the definition of programming interface.

Aspects of such a programming interface may include the method whereby the first code segment transmits information (where "information" is used in its broadest sense and includes data, commands, requests, etc.) to the second code segment; the method whereby the second code segment receives the information; and the structure, sequence, syntax, organization, schema, timing and content of the information. In this regard, the underlying transport medium itself may be unimportant to the operation of the interface, whether the medium be wired or wireless, or a combination of both, as long as the information is transported in the manner defined by the interface. In certain situations, information may not be passed in one or both directions in the conventional sense, as the information transfer may be either via another mechanism (e.g. information placed in a buffer, file, etc. separate from information flow between the code segments) or non-existent, as when one code segment simply accesses functionality performed by a second code segment. Any or all of these aspects may be important in a given situation, e.g., depending on whether the code segments are part of a system in a loosely coupled or tightly coupled configuration, and so this list should be considered illustrative and non-limiting.

This notion of a programming interface is known to those skilled in the art and is clear from the foregoing detailed description of the invention. There are, however, other ways to implement a programming interface, and, unless expressly excluded, these too are intended to be encompassed by the claims set forth at the end of this specification. Such other ways may appear to be more sophisticated or complex than the simplistic view of FIGS. 1B and 1C, but they nonetheless perform a similar function to accomplish the same overall result. We will now briefly describe some illustrative alternative implementations of a programming interface.

A. Factoring

Figure 1D:
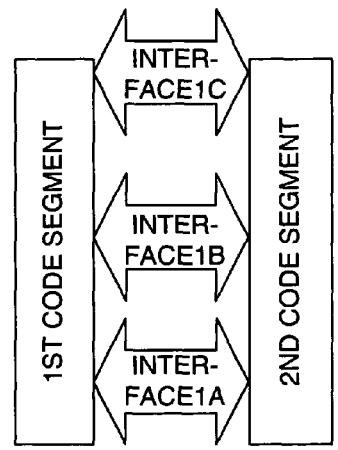

A communication from one code segment to another may be accomplished indirectly by breaking the communication into multiple discrete communications. This is depicted schematically in FIGS. 1D and 1E. As shown, some interfaces can be described in terms of divisible sets of functionality. Thus, the interface functionality of FIGS. 1B and 1C may be factored to achieve the same result, just as one may mathematically provide 24, or 2 times 2 times 3 times 2. Accordingly, as illustrated in FIG. 1D, the function provided by interface Interface1 may be subdivided to convert the communications of the interface into multiple interfaces Interface1A, Interface1B, Interface1C, etc. while achieving the same result. As illustrated in FIG. 1E, the function provided by interface I1 may be subdivided into multiple interfaces I1$a$, I1$b$, I1$c$, etc. while achieving the same result. Similarly, interface I2 of the second code segment which receives information from the first code segment may be factored into multiple interfaces I2$a$, I2$b$, I2$c$, etc. When factoring, the number of interfaces included with the 1st code segment need not match the number of interfaces included with the 2nd code segment. In either of the cases of FIGS. 1D and 1E, the functional spirit of interfaces Interface1 and I1 remain the same as with FIGS. 1B and 1C, respectively. The factoring of interfaces may also follow associative, commutative, and other mathematical properties such that the factoring may be difficult to recognize. For instance, ordering of operations may be unimportant, and consequently, a function carried out by an interface may be carried out well in advance of reaching the interface, by another piece of code or interface, or performed by a separate component of the system. Moreover, one of ordinary skill in the programming arts can appreciate that there are a variety of ways of making different function calls that achieve the same result.

B. Redefinition

Figure 1F:
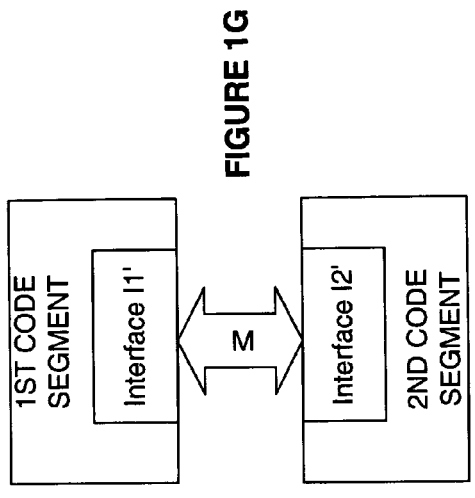
Figure 1G:
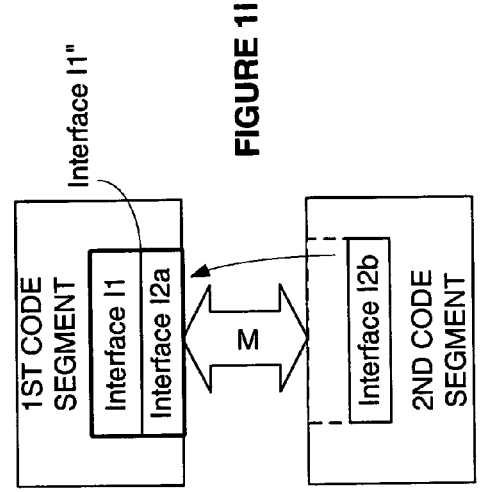

In some cases, it may be possible to ignore, add or redefine certain aspects (e.g., parameters) of a programming interface while still accomplishing the intended result. This is illustrated in FIGS. 1F and 1G. For example, assume interface Interface1 of FIG. 1B includes a function call Square (input, precision, output), a call that includes three parameters, input, precision and output, and which is issued from the 1st Code Segment to the 2nd Code Segment. If the middle parameter precision is of no concern in a given scenario, as shown in FIG. 1F, it could just as well be ignored or even replaced with a meaningless (in this situation) parameter. One may also add an additional parameter of no concern. In either event, the functionality of square can be achieved, so long as output is returned after input is squared by the second code segment. Precision may very well be a meaningful parameter to some downstream or other portion of the computing system; however, once it is recognized that precision is not necessary for the narrow purpose of calculating the square, it may be replaced or ignored. For example, instead of passing a valid precision value, a meaningless value such as a birth date could be passed without adversely affecting the result. Similarly, as shown in FIG. 1G, interface I1 is replaced by interface I1', redefined to ignore or add parameters to the interface. Interface I2 may similarly be redefined as interface I2', redefined to ignore unnecessary parameters, or parameters that may be processed elsewhere. The point here is that in some cases a programming interface may include aspects, such as parameters, which are not needed for some purpose, and so they may be ignored or redefined, or processed elsewhere for other purposes.

C. Inline Coding

Figure 1H:
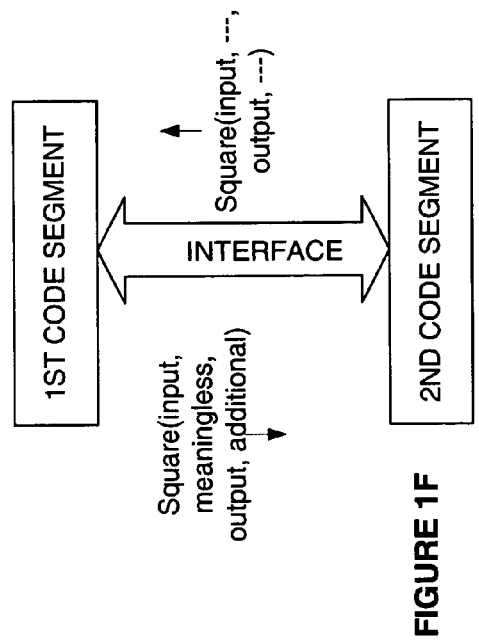
Figure 1I:
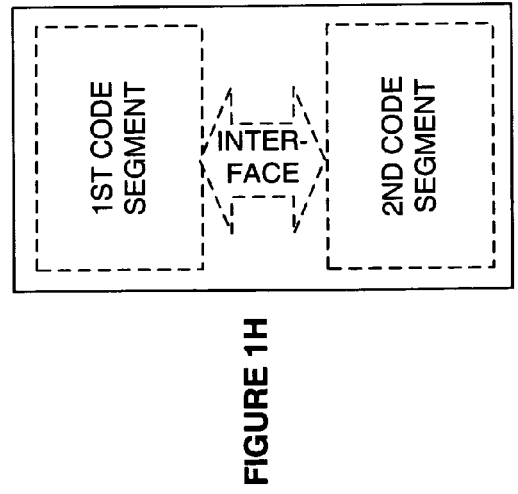

It may also be feasible to merge some or all of the functionality of two separate code modules such that the "interface" between them changes form. For example, the functionality of FIGS. 1B and 1C may be converted to the functionality of FIGS. 1H and 1I, respectively. In FIG. 1H, the previous 1st and 2nd Code Segments of FIG. 1B are merged into a module containing both of them. In this case, the code segments may still be communicating with each other but the interface may be adapted to a form which is more suitable to the single module. Thus, for example, formal Call and Return statements may no longer be necessary, but similar processing or response(s) pursuant to interface Interface1 may still be in effect. Similarly, shown in FIG. 1I, part (or all) of interface I2 from FIG. 1C may be written inline into interface I1 to form interface I1". As illustrated, interface I2 is divided into I2a and I2b, and interface portion I2a has been coded in-line with interface I1 to form interface I1". For a concrete example, consider that the interface I1 from FIG. 1C performs a function call square (input, output), which is received by interface I2, which after processing the value passed with input (to calculate the square of an input) by the second code segment, passes back the squared result with output. In such a case, the processing performed by the second code segment (squaring input) can be performed by the first code segment without a call to the interface.

D. Divorce

Figure 1K:
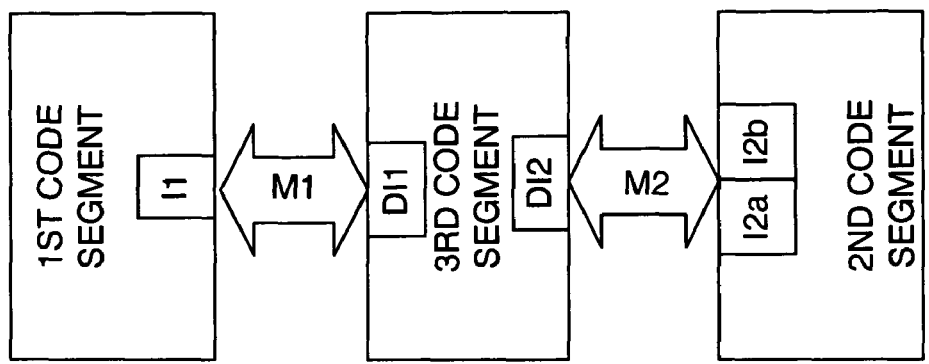
Figure 1J:
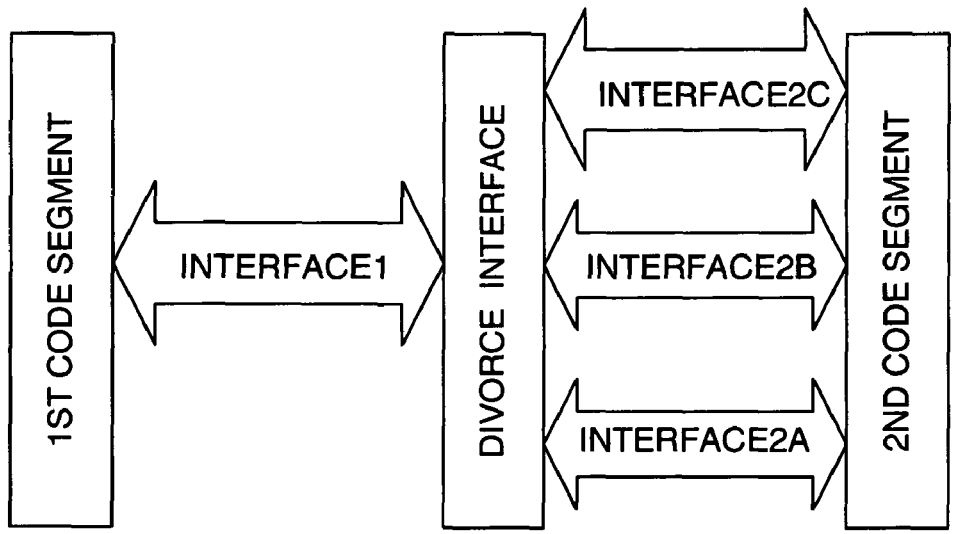

A communication from one code segment to another may be accomplished indirectly by breaking the communication into multiple discrete communications. This is depicted schematically in FIGS. 1J and 1K. As shown in FIG. 1J, one or more piece(s) of code (Divorce Interface(s), since they divorce functionality and/or interface functions from the original interface) are provided to convert the communications on the first interface, Interface1, to conform them to a different interface, in this case interfaces Interface2A, Interface2B and Interface2C. This might be done, e.g., where there is an installed base of applications designed to communicate with, say, an operating system in accordance with an Interface1 protocol, but then the operating system is changed to use a different interface, in this case interfaces Interface2A, Interface2B and Interface2C. The point is that the original interface used by the 2nd Code Segment is changed such that it is no longer compatible with the interface used by the 1st Code Segment, and so an intermediary is used to make the old and new interfaces compatible. Similarly, as shown in FIG. 1K, a third code segment can be introduced with divorce interface DI1 to receive the communications from interface I1 and with divorce interface DI2 to transmit the interface functionality to, for example, interfaces I2a and I2b, redesigned to work with DI2, but to provide the same functional result. Similarly, DI1 and DI2 may work together to translate the functionality of interfaces I1 and I2 of FIG. 1C to a new operating system, while providing the same or similar functional result.

E. Rewriting

Figure 1L:
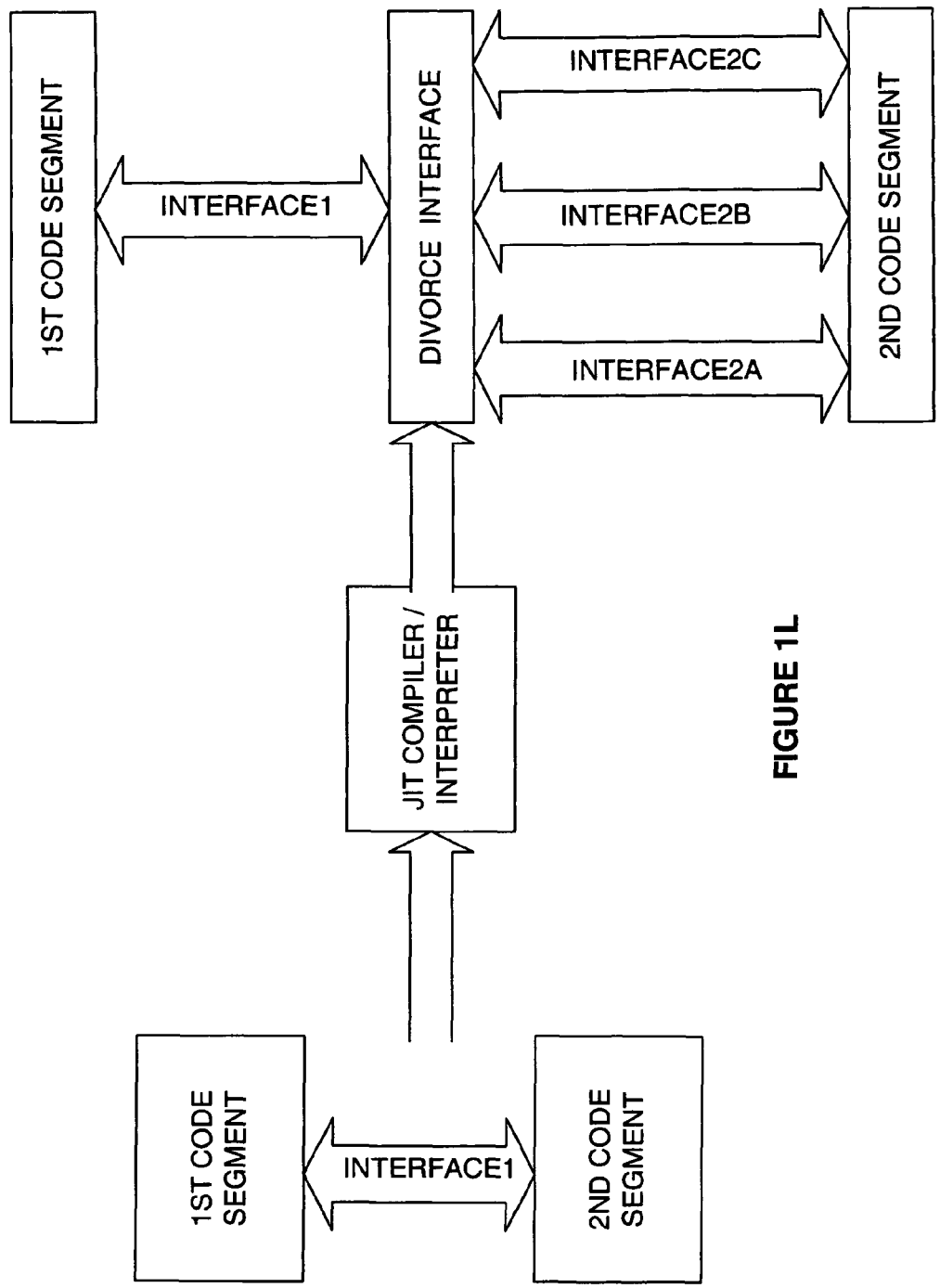
Figure 1M:
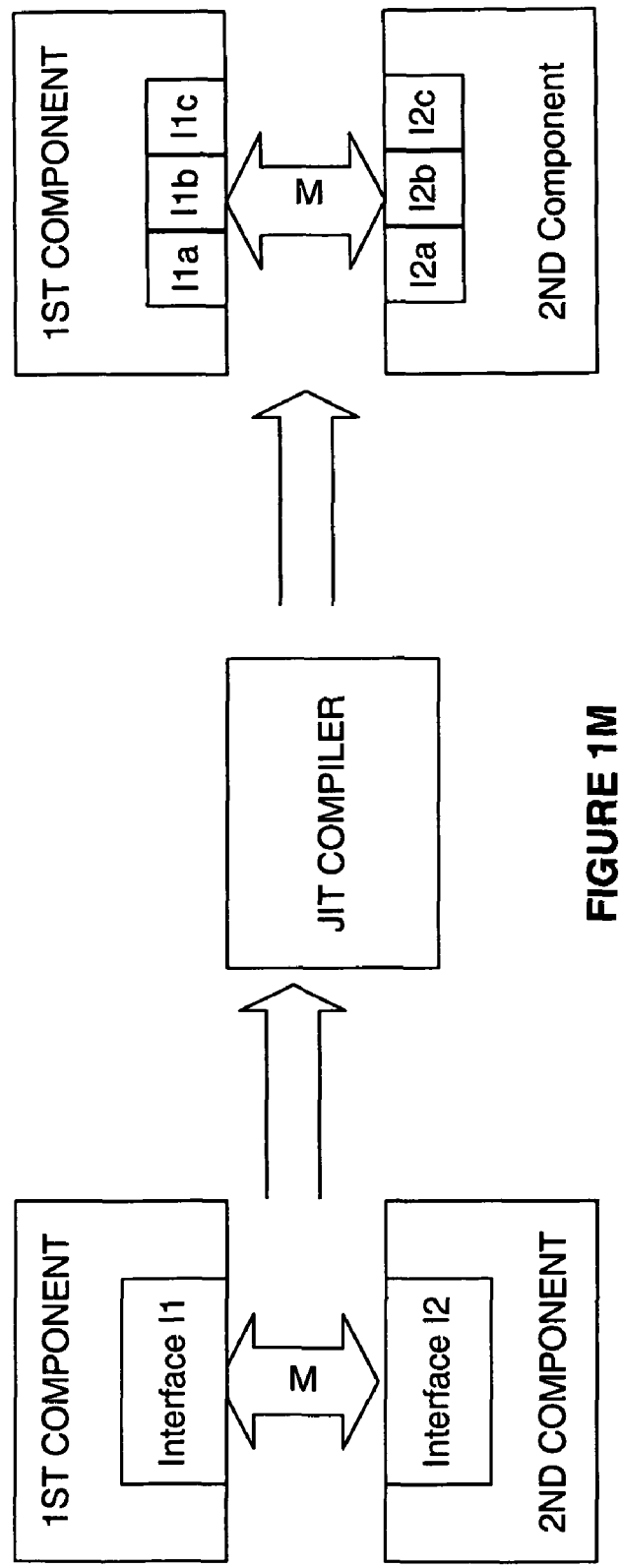

Yet another possible variant is to dynamically rewrite the code to replace the interface functionality with something else but which achieves the same overall result. For example, there may be a system in which a code segment presented in an intermediate language (e.g. Microsoft IL, Java ByteCode, etc.) is provided to a Just-in-Time (JIT) compiler or interpreter in an execution environment (such as that provided by the Net framework, the Java runtime environment, or other similar runtime type environments). The JIT compiler may be written so as to dynamically convert the communications from the 1st Code Segment to the 2nd Code Segment, i.e., to conform them to a different interface as may be required by the 2nd Code Segment (either the original or a different 2nd Code Segment). This is depicted in FIGS. 1L and 1M. As can be seen in FIG. 1L, this approach is similar to the Divorce scenario described above. It might be done, e.g., where an installed base of applications are designed to communicate with an operating system in accordance with an Interface1 protocol, but then the operating system is changed to use a different interface. The JIT Compiler could be used to conform the communications on the fly from the installed-base applications to the new interface of the operating system. As depicted in FIG. 1M, this approach of dynamically rewriting the interface(s) may be applied to dynamically factor, or otherwise alter the interface(s) as well.

It is also noted that the above-described scenarios for achieving the same or similar result as an interface via alternative embodiments may also be combined in various ways, serially and/or in parallel, or with other intervening code. Thus, the alternative embodiments presented above are not mutually exclusive and may be mixed, matched and combined to produce the same or equivalent scenarios to the generic scenarios presented in FIGS. 1B and 1C. It is also noted that, as with most programming constructs, there are other similar ways of achieving the same or similar functionality of an interface which may not be described herein, but nonetheless are represented by the spirit and scope of the invention, i.e., it is noted that it is at least partly the functionality represented by, and the advantageous results enabled by, an interface that underlie the value of an interface.

Figure 2:
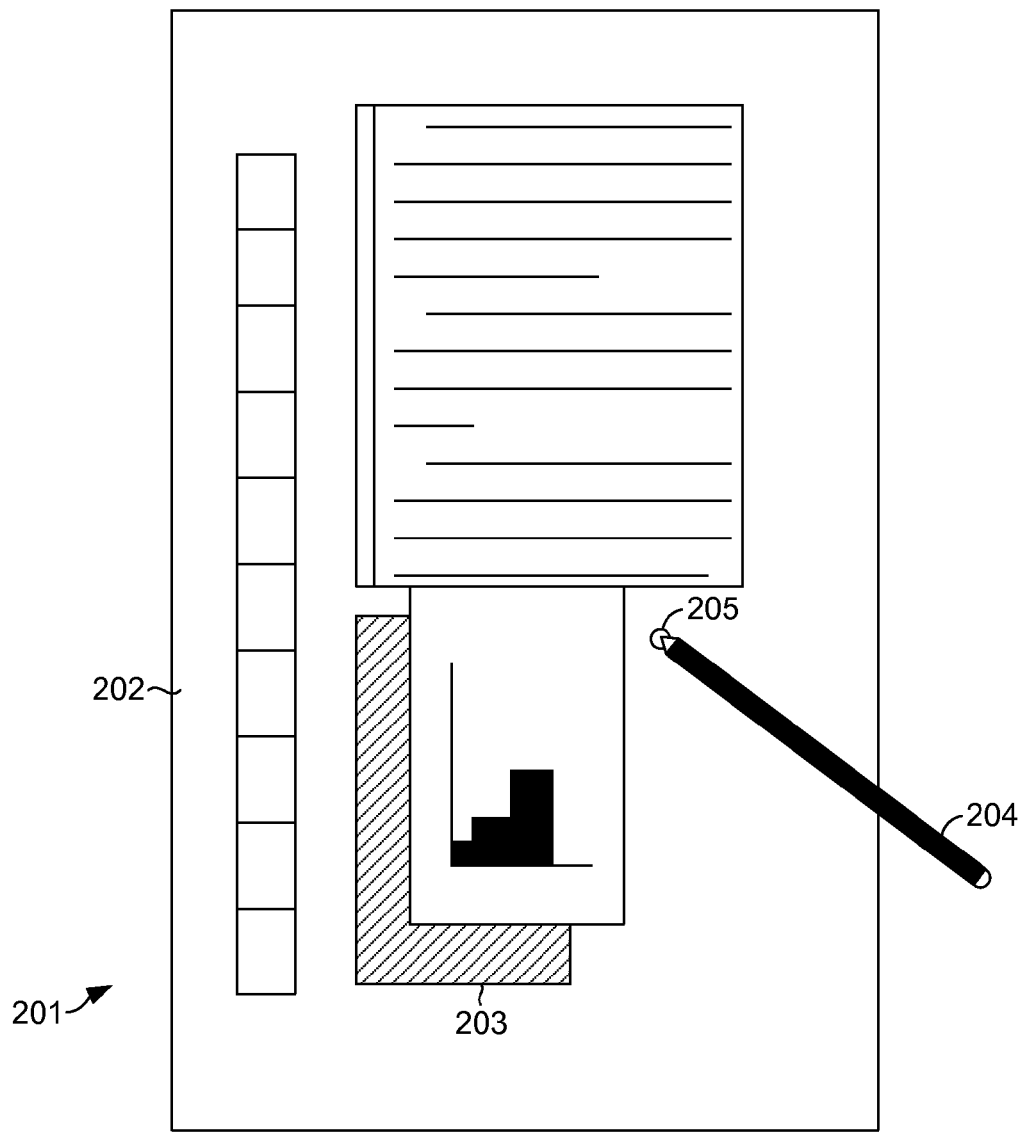
FIG. 2 shows an illustrative example of a pen-based computing system in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Auto Suggest and Handwritten Input

Auto-complete processes (also known as Auto-Suggest processes), most recently used (MRU) lists, and most frequently used (MFU) lists are popular features and used by numerous applications and in several fields in various operating system shells. One of the values of these lists is that they increase the ease with which users can input hard to remember irregular text such as email addresses, URLs and filenames. The value is even greater for users who are entering email addresses, URLs or filenames using handwriting because handwriting recognition is typically worst for out of dictionary word such as these, making the process of entering these data types even more cumbersome.

Aspects of the invention relate to integrating various applications' auto-suggest (also, auto-complete) with handwriting input. Because of this integration, the user may find an increase in the ease of use, speed of throughput, and user satisfaction with both handwriting input and the application with which they are interacting.

Figure 3:
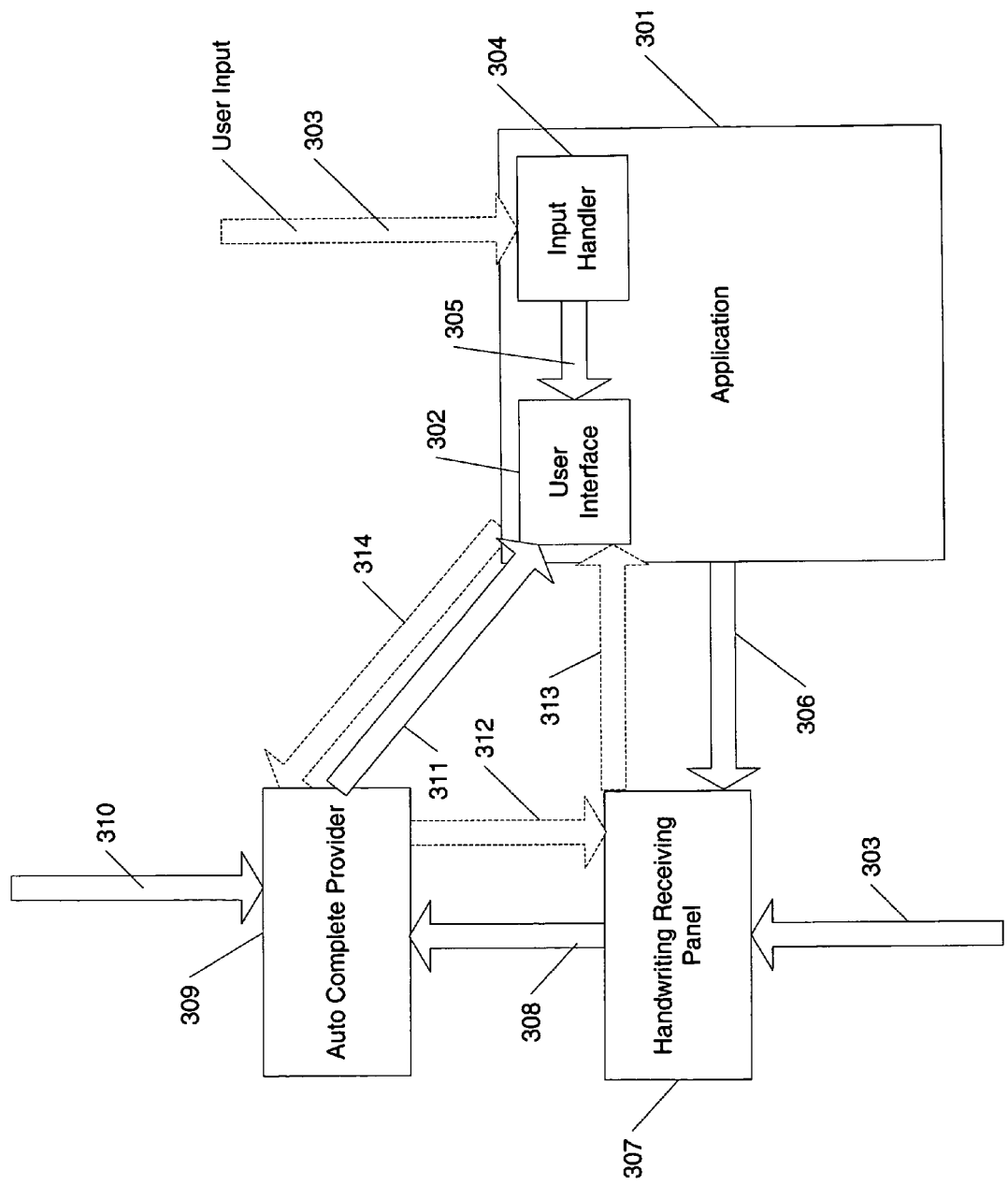
FIG. 3 shows interaction between illustrative components accordance with aspects of the present invention.

FIG. 3 shows an illustrative example of aspects of the invention. Here, an application 301 includes a user interface 302. The user inputs information (user input 303). The application may include an input handler 304 that forwards 305 the information for display in said user interface 302. It is noted that the user input information may be handled by application 301 or handwriting receiving panel 307. The user input 303 to application 301 directly is shown in broken lines as users may not need to always input information separately into application 301. In some situations, for example, using a slate-type tablet or pen computing device with limited or no keys, that either application 301 may receive stylus-based information or the user may only enter information using the handwriting receiving panel 307, thereby bypassing entering information directly to application 301.

A user or application 301 may call the handwriting receiving panel 307. The handwriting receiving panel 307 may include an interface and processes for receiving at least handwritten input in the form of electronic ink created by interaction of a stylus and a digitizer. It is appreciated that the handwriting receiving panel 307 may also receive other types of information including keyboard input (actual or displayed) and mouse input by way of the soft keyboard above and/or by way of a user drawing ink using the mouse. It is appreciated that the handwriting receiving panel 307 may be used with both active and passive digitizers. The handwriting receiving panel 307 may include various types of input displays including but not limited to at least one of a lined input (displaying a guide line on which ink is drawn), a boxed input (with a separate delimited area for each character or symbol input), a keyboard input (a soft keyboard), or a general blank input area. An example of the handwriting receiving panel 307 with at least some of these options is the TIP (Tablet Input Panel) from Microsoft Corporation of Redmond, Wash.

The user next enters information 303 (for instance, handwritten ink) in handwriting receiving panel 307. The handwriting receiving panel 307 attempts to recognize the input information 303 and forwards 308 the recognition results to auto complete provider 309. The auto complete provider 309 provides a user with auto complete suggestions in response to the recognized information forward to the auto complete provider 309 from the handwriting receiving panel 307. The user then selects one of the suggestions through input 310 and the selection is forwarded 311 to the application 301 for display in the user interface 302. After the selection has been made, the auto complete provider 309 closes user interface for the list of suggestions.

Aspects of the invention describe the auto complete provider 309 as separate from the handwriting receiving panel 307. In alternative aspects of the invention, the auto complete provider 309 may be integrated into the handwriting receiving panel 307. In yet a further aspect, the handwriting receiving panel 307 may be integrated into the auto complete provider 309. In these two latter aspects, the user is provided with the ability to open one of the handwriting receiving panel 307 and the auto complete provider 309 through control of the user interface of the other.

The following is an example of how a user may use the auto suggest list to forward information to the user interface. First, the user may enter "www" in the handwriting receiving panel 307. The auto complete provider 309 may then provide a list of suggested auto completions.

The user may continue to add information to the handwriting receiving panel 307 (where the auto complete list will be repopulated over time) or may select on of the items from the auto complete list. Once the user has selected one of the entries of the auto complete list, the selection (or indication that a selection has been made) is sent to application 301 and displayed in user interface 302. Here, the content in the handwriting receiving panel 307 may be cleared once the user has selected one of the items from the auto complete list. The user may continue to add more information to the handwriting receiving panel 307 and have newly recognized information being passed to the auto complete list, and the user's selection of the suggested results forwarded to application 301.

As an alternative, the handwriting receiving panel 307 and the auto complete provider 309 may exchange information 308, 312 until a user is satisfied with the results. Next, the handwriting receiving panel 307 forwards 313 the results of the interchange between handwriting receiving panel 307 and auto complete provider 309 to application 301 for display in user interface 302. As an example, the above entry of "www" is used. Similar to the above, the user enters handwritten information 303 that is recognized by handwriting receiving panel 307 as "www". The auto complete provider 309 provides a list of suggested completions. Once a user selects one of the suggested completions through user input 310, the suggested completion is returned via path 312 to the handwriting receiving panel 307 where the recognized result in handwriting receiving panel 307 is replaced with the selected completion. The user may then add additional information to the suggested completion resident in the handwriting receiving panel 307. Finally, after the string is complete, the user may then forward (manually or automatically through use of a timed auto forwarding of the string) via path 313 to application 301 for display in user interface 302.

Finally, as yet another alternative, application 314 may forward information in user interface 302 to auto complete provider 309 to use as initial information for a suggest list. This initial information may sometimes be referred to as leading information. Recognition results 308 from handwriting receiving panel 307 may be then combined with the content from user interface 302 as information to which auto complete provider 309 responds by providing suggested content. The selected suggestion from auto complete provider 309 may then be forwarded to application 301 by any of the paths described above (311 or 312/313).

The handwriting receiving panel 307 may own the auto complete process and draw the auto-suggest list. Alternatively, the handwriting receiving panel 307 may influence the positioning of the auto-suggest list as provided from the auto complete provider 309. This may be done through an application programming interface for the auto complete provider 309.

Figure 4:
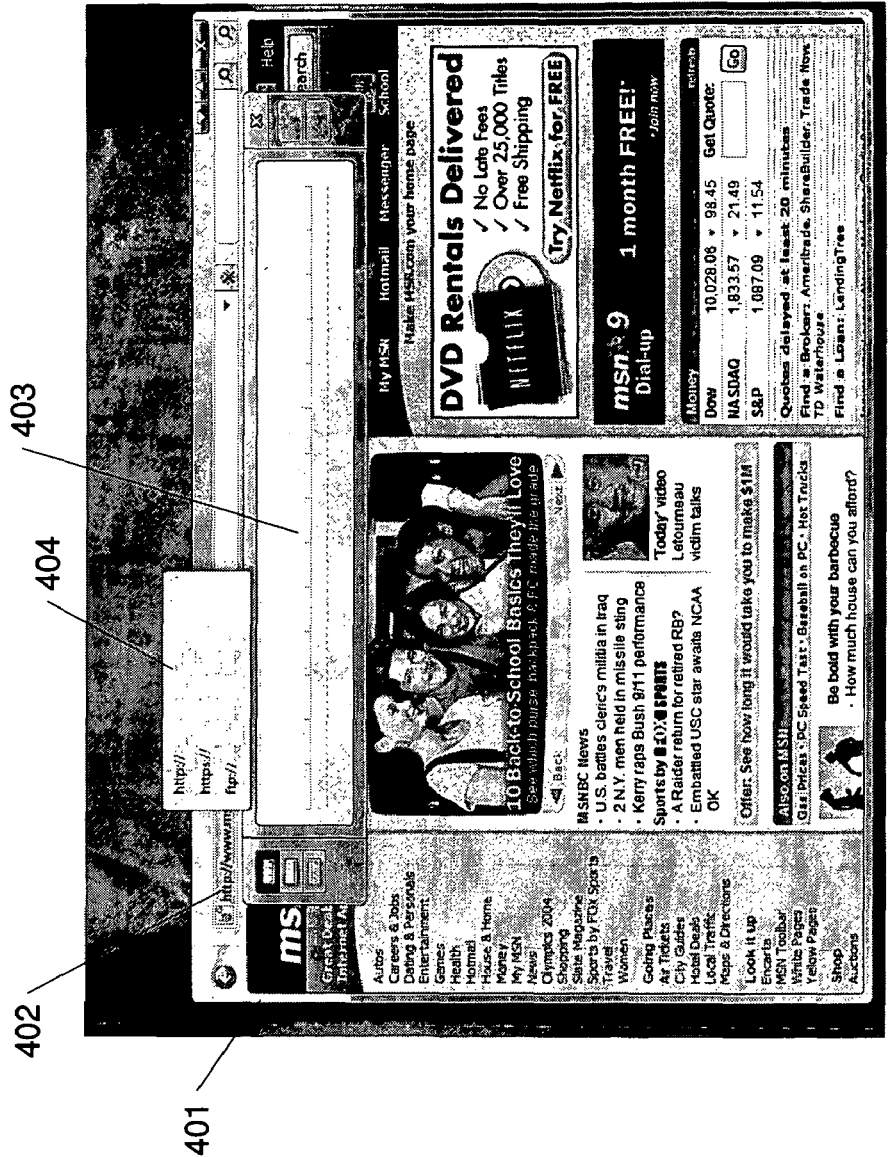
FIG. 4 shows an example of an auto suggest list in accordance with aspects of the present invention.

FIG. 4 shows an application 401 with an input field 402. A user may enter handwritten ink through handwriting receiving panel 403 with an auto-suggest list 404 displayed in the vicinity of the handwriting receiving panel 403. The auto-suggest list may have been generated by the auto complete provider 309.

The information provided in the auto-suggest list may vary by application. For instance, for an internet browser, the auto-suggest list may include information pertaining to World Wide Web addresses or top level domain identifiers. For email applications, the auto-suggest list may include information pertaining may include email addresses from a person's address book of emails.

The applications may reposition their auto-suggest lists to appear relative to the TIP instead of the application's text field. The following provide guidelines regarding how an application's auto-suggest list can be positioned.

In order to not appear under the user's hand, auto-suggest lists may appear above the top edge of the handwriting receiving panel when they can fit there without going off the top edge of the screen. The bottom edge of the Auto-Suggest list may touch the top edge of the handwriting receiving panel writing surface. If they can not fit above the handwriting receiving panel, then they may position themselves below the bottom edge of the handwriting receiving panel. In the case, the top edge of the Auto-Suggest list may touch the bottom edge of the handwriting receiving panel writing surface.

When the handwriting receiving panel has expanded to include more than 1 line of ink, the auto-suggest list may position itself relative to the current line on which the user is inking. In this case the auto-suggest list may treat the top and bottom of the line as if they were the top and bottom of the handwriting receiving panel. Alternatively, the auto-suggest list may always appear relative to the top or bottom line of the inking surface.

Auto-suggest lists may appear left align above the first trailing blank space in the handwriting receiving panel. In the lined version of the handwriting receiving panel, the auto-suggest list may appear with the left edge of the auto-suggest list aligned with the right edge of the last ink object on the last line. In the boxed input mode of the auto-suggest list, the auto-suggest list may appear with the left edge of the auto-suggest list aligned with the left edge of the first trailing empty box. In either skin, if it is not possible for the list to be left aligned without going of the right edge of the screen, the list becomes right aligned against the right edge of the screen.

Any time an auto-suggest list is showing and the user puts the pen down out-side of the auto-suggest list, the auto-suggest list may hide.

Any time a correction is made to the last word in the handwriting receiving panel, the auto-suggest list may be updated and re-shown.

When a user uses a hard or soft keyboard, an application's auto-suggest list may be positioned relative to the text entry field and not the handwriting receiving panel. In these cases, the auto-suggest list may look and function in the same manner as it does on a desktop. Alternatively, when the soft keyboard is used, the auto-suggest list may be positioned relative to the soft keyboard. One of the benefits of positioning the auto-suggest list near the soft keyboard is the limited movement needed to navigate from one to the other, thereby making interaction with both easier for the user.

The auto-suggest list may appear immediately after recognition is preformed and recognition results are updated. In the boxed input mode of the handwriting receiving panel, the Auto-Suggest list updates after each character is recognized. In the lined input mode of the handwriting receiving panel, the Auto-Suggest list updates after a segment is recognized.

Figure 5:
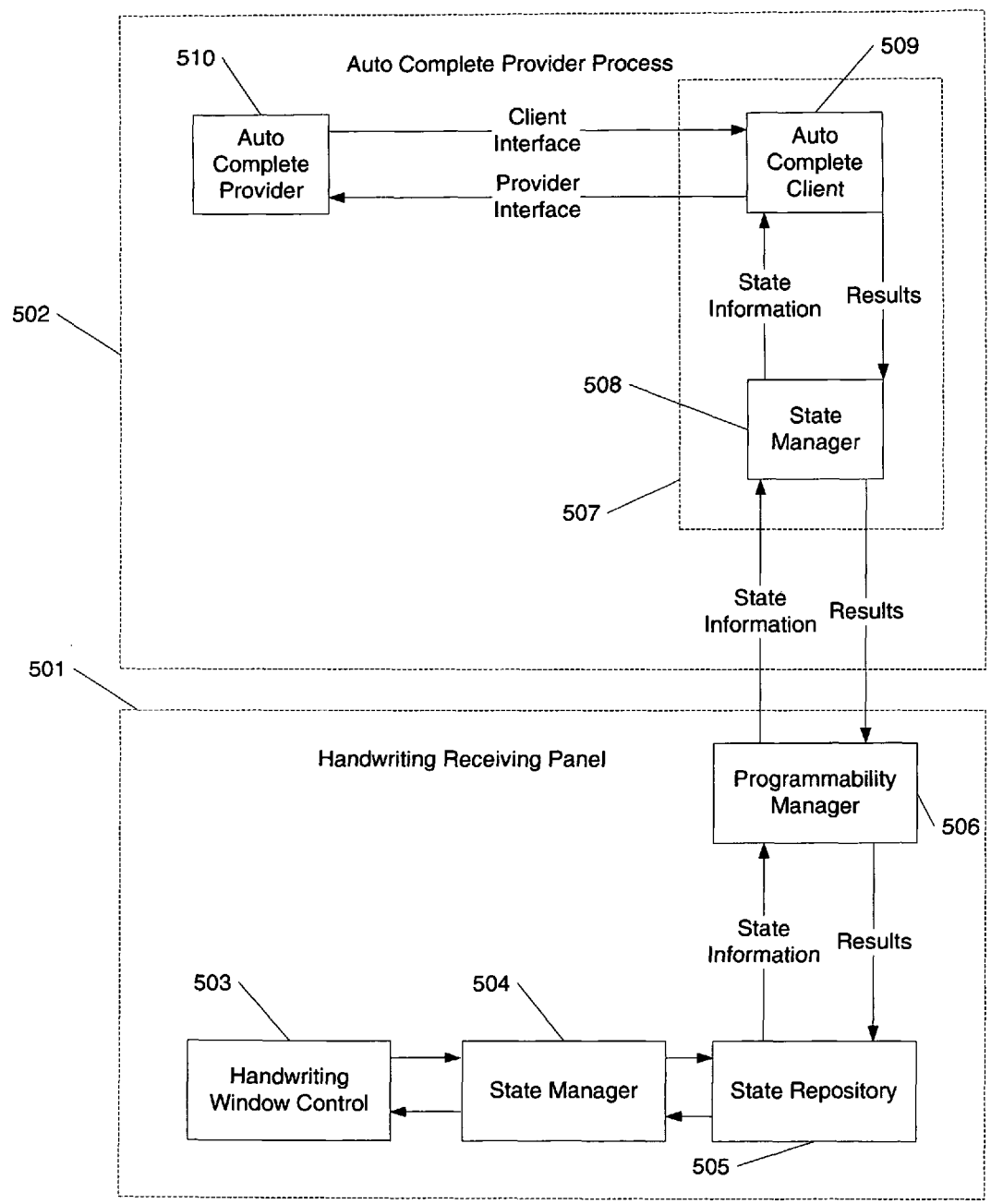
FIG. 5 shows various objects interacting in at least one aspect of the present invention.

FIG. 5 shows various relationships between components in accordance with aspects of the present invention. A handwriting receiving panel 501 includes a handwriting window control 503 that exchanges information with a state manager 504. The state manager 504 is connected to a state repository 505, which is connected to a programmability manager. State information is sent and results are received. The programmability manager 506 sends state information to auto complete provider process 502.

The auto complete provider process 502 includes a handwriting receiving panel object 507 with a state manager 508 and an auto complete client 509. The auto complete client 509 exchanges information with the auto complete provider 510.

Here, the handwriting receiving panel 501 calls the auto complete provider 510 and forwards recognition results from the handwriting receiving panel 501. The auto complete provider 510 in the auto complete provider process 502 generates an auto complete list with content for display to a user.

The following describes a possible application programming interface definition that allows an application or handwriting receiving panel to access to the auto-suggest list and input information.

The auto complete client may have an auto complete client interface that is exposed to the auto complete provider 510.

The auto complete client interface may include an advise provider method that registers the auto complete provider to be registered to the auto complete client. The method may include a pointer to the auto complete provider interface to be registered to the auto complete client.

The auto complete client may similarly have an unadvise provider method that unregisters the auto complete provider interface from the auto complete client.

A user selection interface may also exist that may perform in one of two ways. First, if information is forwarded with this method, the user's selection may be forwarded back to the handwriting receiving panel for additional information to be appended to it. Second, if no information is forwarded with this method, it may be used to notify the selection that the user has made a choice.

The API may also include a specification of the preferred rectangle in which to display the auto suggest list. The method may include a pointer to the rectangle in screen coordinates indicating the provider's preferred location and the size of the auto complete list user interface, a pointer to the rectangle in screen coordinates indicating the location and the size of the focused field, a pointer to the rectangle modified by the AutoComplete client based on the current state of the handwriting receiving panel and the preferred auto complete list location and size specified by auto complete list.

The API may include a request to show the user interface. This is the call that the auto complete provider makes when it is about to show the auto complete UI. The Auto Complete Client may modify the provider's preferred rectangle.

This is the call that the auto complete provider makes when it is about to show the auto complete UI.

Next, the auto complete provider may include the following interfaces:

An update pending text method that updates the pending text used to generate the auto complete list. This text will not contain the text already inserted in the focused field and the auto complete provider is responsible to take into account of the current field text and the selection to generate the auto complete list. This method may also specify the characters at which the auto complete list should be displayed. This method may trigger the provider to display the auto complete list UI.

A show method may be used to show or hide the auto complete list.

The following extensions may or may not be used with aspects of the present invention.

An application may forward to the handwriting receiving panel the auto-suggest list as text and have the handwriting receiving panel own and draw an auto-suggest list relative to the handwriting receiving panel, populated with the auto-suggest values thus provided by the application. The handwriting receiving panel drawn list could either be floated above the way the repositioned application list does or been fully integrated into the handwriting receiving panel UI. Alternatively, the auto-suggest list may not be repositioned, but rather remain in its current location. Further, the auto-suggest list may be placed anywhere by an application, by an operating system, or by a user.

An application may be passed two or more of the top recognition results and having the application generate an auto-complete list based on the different recognition possibilities.

One may integrate auto-complete for fields with prose text prediction, so that within a single list the user gets both auto-completed URL or email addresses and prediction of in dictionary words they might be entering (regardless of whether they have ever typed that word before or not. The intention is to extend the current auto-complete implementation to general text in the future.

Figure 6:
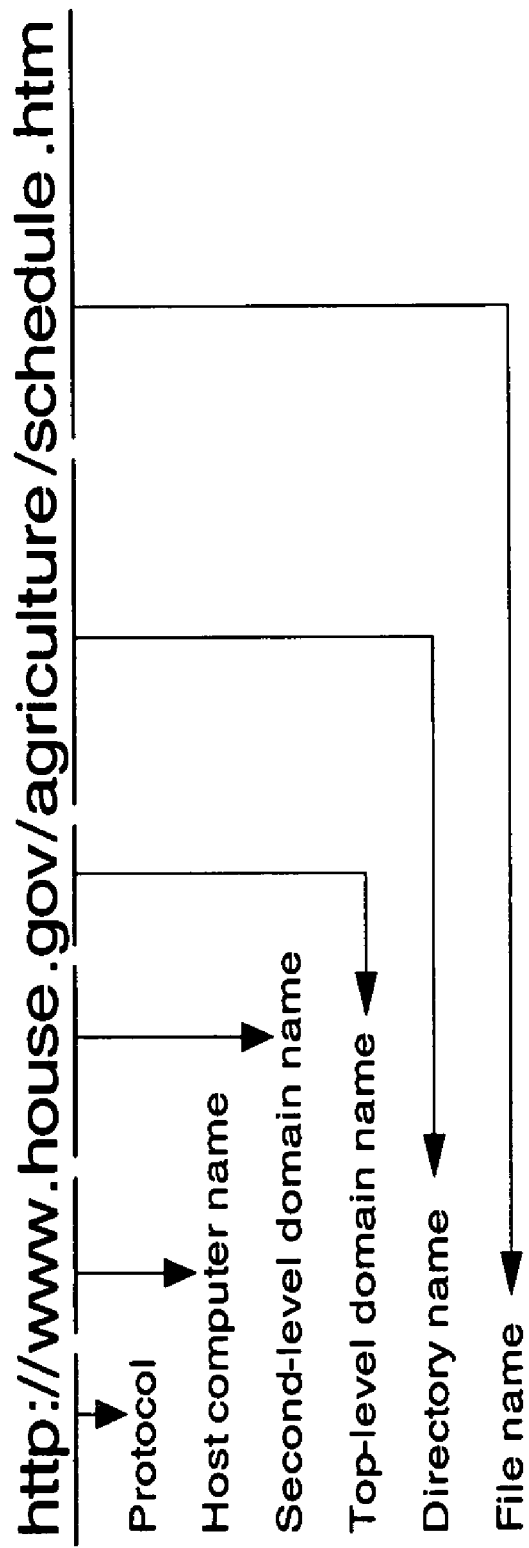
FIG. 6 shows another example of results from an auto-suggest list in accordance with aspects of the present invention.
Figure 7:
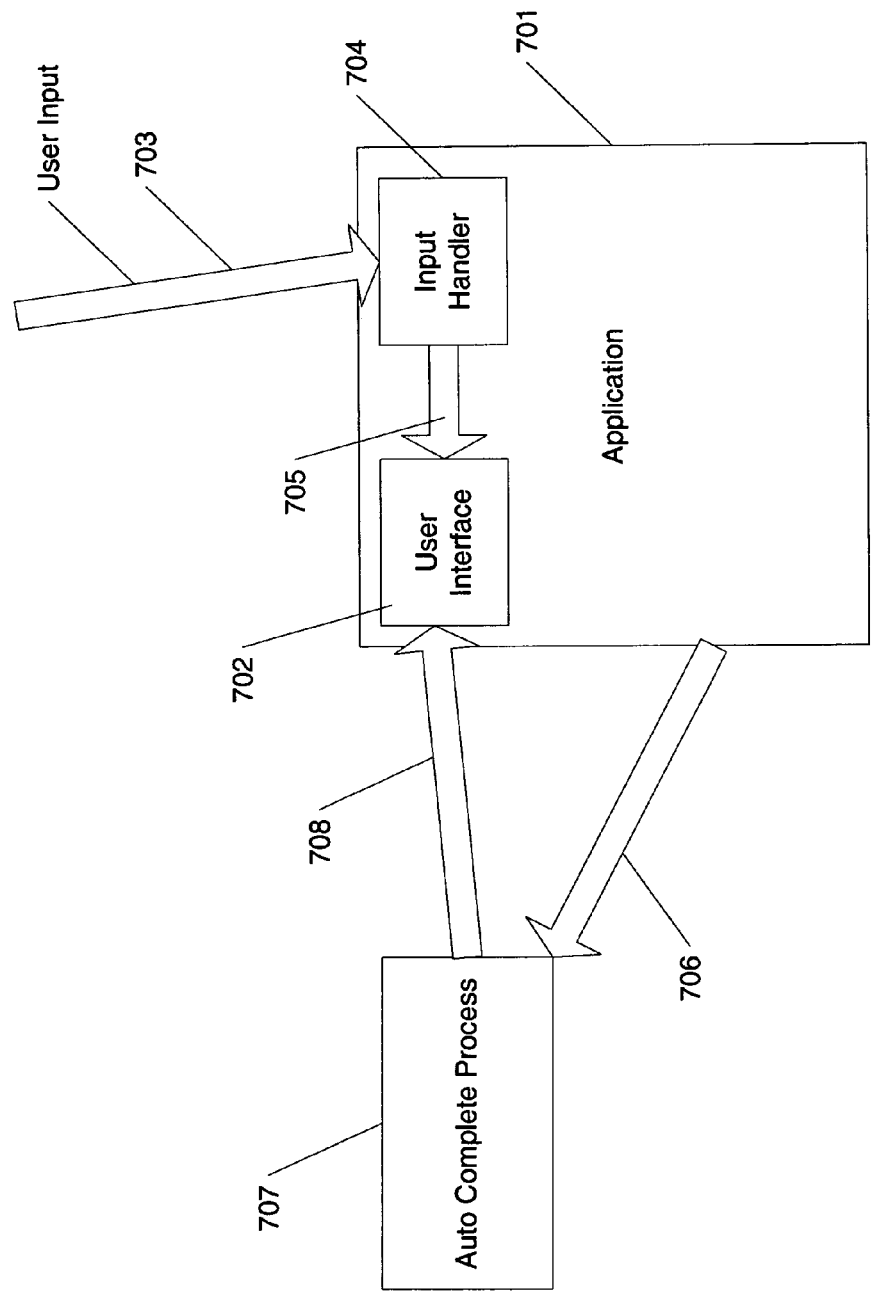
FIG. 7 shows a conventional auto suggest list interacting with an application.

One may parse URLs in to parts or building blocks that can be used to navigate to parent or sibling addresses a user has previously been to. This may be done by including an AdjustAutoCompleteList method on the IAutoCompleteResults interface. This method allowed the handwriting receiving panel to modify the list entries the application would show before it showed them. Additional information is shown in FIG. 6 and follows:

AdjustAutocompleteList( ) gets called by the auto complete list provider to a pen input panel object. The pen input panel object may contain the finalized and the boxed hint text saved in itself when this method is called. Within this method, as the default, the pen input panel will search for the first occurrence of the finalized hint string finalized hint text within the given auto complete string and the trim the finalized hint string from the auto complete string as follows:

The finalized hint text="AAA"

The auto complete string="000AAABBBCCC"

The result string after trimming the finalized hint text="BBBCCC"

Any piece of the auto complete string before the finalized hint text (in the above example "000") is also trimmed out.

When the current input scope is set to IS_URL, the trimming is done in the specific way. The definition of the pieces of the URL is given as shown in FIG. 6.

Further, the auto complete list may be used for internet addresses as follows.

The protocol string is the portion of the string that is followed by "//".

The host computer name is the portion of the string that is following the protocol string and followed by a period.

The top level domain name is the last piece of the string following the period character before any slash character within the string.

When the host computer name and the top level domain name exist, the second level domain name is the piece of the string separated with the period left to the top level domain name. If there are multiple segment of the piece separated by the period character between the host computer name and the top level domain name, they are dealt as 2nd or higher level of the domain name. The boxed skin may not differentiate the 2nd or higher level of domain name and they can be handled as one piece.

If there is a top level domain, then
The file name is the piece of the string following the last slash character after the protocol separator.
The piece of the string between the file name and the first slash character after the protocol separator is the directories.

If there is no top level domain:
The file name is the piece of the string following the last slash character.
The directory is the piece of the string between the file name and the protocol separator.

The boxed input mode may chop the strings into the following units:
Protocol string with the protocol separator.
Host computer name with the following separator.
Domain name with the following separator.
Directory and file name After all the full auto complete strings are examined and modified, the boxed skin may remove any duplicated items from the list.

Next, the system may start index of the display string. The starting character index within the full auto complete string to be returned from an adjust auto complete list is determined in exactly same way as the default auto complete list. It may be the end of the first occurrence of the finalized hint text within the full string.

For the end index of the display string, the following steps define the end location of the character in the auto complete string to be returned.
  a. If the hint text ends before the protocol separator in the full string (excluding the second slash of the protocol separator), the end location is at the end of the protocol string including the protocol separator.
  b. If (a) is false and the hint text ends before separator following the host computer name in the full string, the end location is at the end of the host computer name including the following separator.
  c. If (b) is false and the hint text ends before the separator following the top level domain name in the full string, the end location is at the end of the top-level domain name including the following separator.

d. If (c) is false and the hint text ends within the directory or the file name in the full string (including the separator between the domain name and the directory name), the end location is at the end of the full string.

In an alternate approach, the auto-complete provider may manage all of the rendering of the auto suggest list. For instance, the auto-complete provider may receive an indication of the location (relative with respect to other displayed content or absolute) of the handwriting receiving panel and position the auto suggest list based the location of the handwriting receiving panel. In another example, the auto-complete provider may not receive any indication of the location of the handwriting input panel and may locate the auto suggest list at a predetermined location (near one side of the screen or centered or the like), or may locate the auto suggest list near other displayed content (for instance, separated from, overlapping, or on top of a user interface of an application to which the selected content from the auto-suggest list will be sent). or over top of The present invention has been described in terms of preferred and illustrative embodiments thereof. Numerous other embodiments, modifications and variations within the scope and spirit of the appended claims will occur to persons of ordinary skill in the art from a review of this disclosure.

We claim:

1. A computer-implemented method for receiving user input comprising:
    receiving handwritten input via a user entering information in a handwriting receiving panel in a form of electronic ink, the electronic ink is a sequence or a set of strokes with properties, the handwriting receiving panel attempts to recognize the handwritten input and forwards recognition results of the handwritten input to an auto-complete provider as text;
    integrating said handwritten input via the auto-complete provider that provides an auto-suggest list comprising a list of suggested completions based on said text, wherein the auto-suggest list varies by application, such that the auto-suggest list updates after each character of the text is recognized or after a segment of the text is recognized, the auto-suggest list updates after a subsequent character or subsequent segment of text is recognized, and wherein the user adds additional information to a user selection and has newly recognized information forwarded to the auto-complete provider;
    registering the auto-complete provider to an auto-complete client, wherein the auto-complete client identifies and stores a pointer to the auto-complete provider, and wherein the auto-complete client exchanges data with the auto-complete provider;
    forwarding the user selection back to the handwriting receiving panel for additional information to be appended to the user selection; and
    notifying the auto-complete provider that the user has made a choice.

2. The computer-implemented method according to claim 1, wherein said auto-suggest list is part of a browser.

3. The computer-implemented method according to claim 1, wherein said autosuggest list is part of an operating system.

4. The computer-implemented method according to claim 1, wherein said autosuggest list is part of an application.

5. The computer-implemented method according to claim 1, further comprising an auto complete provider process and the handwriting receiving panel, wherein the auto complete provider process includes a handwriting receiving panel object that is separate from the handwriting receiving panel, and wherein the handwriting receiving panel object exchanges information with the handwriting receiving panel.

6. A computing system that displays an auto complete list comprising:
    a first user interface that receives text;
    a second user interface that receives handwritten ink via a user entering information in a handwriting receiving panel in a form of electronic ink created by interaction of a finger and a digitizer, the electronic ink is a sequence or a set of strokes with properties, the handwriting receiving panel attempts to recognize the handwritten input and forwards recognition results of the handwritten input to an auto-complete provider as text;
    a third user interface having the auto-complete provider that provides an auto-suggest list comprising a list of suggested completions based on said recognized text, wherein the auto-suggest list varies by application, such that the auto-suggest list updates after each character of the text is recognized or after a segment of the text is recognized, the auto-suggest list updates after a subsequent character or subsequent segment of text is recognized, said third user interface receiving a user selection of said auto-suggest list and said user selection being forwarded to said first user interface, wherein a user adds additional information to the user selection and has newly recognized information forwarded to the auto-complete provider.

7. The computing system according to claim 6, said forwarding of said user selection to first user interface occurring by an auto complete list provider sending said user selection to an application hosting said first user interface.

8. A computer system for receiving user input comprising:
    means for receiving handwritten input via a user entering information in a handwriting receiving panel in the form of electronic ink created by interaction of a finger and a digitizer, the electronic ink is a sequence or a set of strokes with properties, the handwriting receiving panel attempts to recognize the handwritten input and forward recognition results of the handwritten input to an auto-complete provider as recognized text; and
    means for integrating said handwritten input via the auto-complete provider that provides an auto-suggest list comprising a list of suggested completions based on said recognized text, wherein the auto-suggest list varies by application, such that the auto-suggest list updates after each character of a text is recognized or after a segment of the text is recognized, the auto-suggest list updates after a subsequent character or subsequent segment of text is recognized, and wherein a user adds additional information to a user selection and has newly recognized information forwarded to the auto-complete provider.

9. The computer system according to claim 8, wherein said auto-suggest list is part of a browser.

10. The computer system according to claim 8, wherein said auto suggest list is part of an operating system.

11. The computer system according to claim 8, wherein said auto-suggest list is part of an application.

12. The computer system according to claim 8, further comprising an auto complete provider process and the handwriting receiving panel, wherein the auto complete provider process includes a handwriting receiving panel object that is separate from the handwriting receiving panel, and wherein the handwriting receiving panel object exchanges information with the handwriting receiving panel.

* * * * *